US012755113B2

(12) United States Patent
Schwarzkopf et al.

(10) Patent No.: US 12,755,113 B2
(45) Date of Patent: Oct. 6, 2026

(54) POSITION SENSOR FOR THE SPATIALLY RESOLVED DETECTION OF OBJECTS IN A MONITORED ZONE

(71) Applicant: SICK AG, Waldkirch (DE)

(72) Inventors: Sebastian Schwarzkopf, Ammersbek (DE); Björn Sock, Neu Wulmstorf (DE)

(73) Assignee: SICK AG, Waldkirch (DE)

( * ) Notice: Subject to any disclaimer, the term of this patent is extended or adjusted under 35 U.S.C. 154(b) by 14 days.

(21) Appl. No.: 18/795,719

(22) Filed: Aug. 6, 2024

(65) Prior Publication Data

US 2025/0053760 A1 Feb. 13, 2025

(30) Foreign Application Priority Data

Aug. 7, 2023 (DE) ..................... 10 2023 120 865.9

(51) Int. Cl.
*G06K 7/10* (2006.01)
*G01S 13/86* (2006.01)

(52) U.S. Cl.
CPC ........ *G06K 7/10366* (2013.01); *G01S 13/865* (2013.01)

(58) Field of Classification Search
CPC ... G06K 7/10366; G01S 13/865; G01S 13/06; G01S 13/74; G01S 13/82; G01S 13/825;
(Continued)

(56) References Cited

U.S. PATENT DOCUMENTS

2007/0241904 A1* 10/2007 Ozaki ..................... G01S 13/84 340/572.1
2020/0100115 A1* 3/2020 Skaaksrud ........... G01N 33/004
2022/0092281 A1* 3/2022 Trivelpiece ........ G06K 7/10009

FOREIGN PATENT DOCUMENTS

DE 102020206882 A1 12/2021
EP 2927838 A1 10/2015
WO 2020/053650 A1 3/2020

OTHER PUBLICATIONS

Miesen, et al.; "360° Carrier Phase Measurement for UHF RFID Local Positioning", Institute of Microwaves and Photonics, Proceeding of the 2013 IEEE International Conference on RFID Technologies and Applications, Sep. 4-5, Johor Bahru, Malaysia.
(Continued)

*Primary Examiner* — Brian A Zimmerman
*Assistant Examiner* — Cal J Eustaquio
(74) *Attorney, Agent, or Firm* — Nath, Goldberg & Meyer; Jerald L. Meyer

(57) ABSTRACT

The present invention relates to a position sensor for the spatially resolved detection of objects in a monitored zone, comprising a measurement device for determining respective position signals for detected objects that are located in the monitored zone, an RFID reading device that is arranged adjacent to the measurement device and that is configured to transmit RFID control commands into the monitored zone by generating modulated RFID transmission signals and to receive RFID response signals, which are generated by an RFID transponder arranged at an object in response to received RFID control commands, and to determine a phase shift between the RFID transmission signals and the RFID response signals, and an evaluation unit that is connected to the measurement device and the RFID reading device and that is configured to assign at least one respective, temporally corresponding RFID response signal to a respective position signal determined by the measurement device, considering the determined phase shift of this RFID response signal.

6 Claims, 1 Drawing Sheet

(58) Field of Classification Search
CPC ........ G01S 13/84; G01S 13/872; G01S 17/06; G01S 17/86; G01S 13/87
See application file for complete search history.

(56) References Cited

OTHER PUBLICATIONS

Miesen, et al.; "Holographic Localization of Passive UHF RFID Transponders", Institute of Electrical Information Technology; Clausthal University of Technology, 2011 IEEE International Conference on RFID.
European Search Report issued on Dec. 16, 2024, for application No. EP24188979.9.
Examination Report dated Apr. 17, 2024 issued in corresponding German Application No. 10 2023 120 865.9.
Miesen, R., Kirsch, F., Vossiek, M.: Holographic Localization of Passive UHF RFID Transponders. In: International Conference on RFID, 2011. S 32-36.—ISBN 978-1-4244-9606-8.
Miesen, R., [et al.]: 360° Carrier Phase Measurement for UHF RFID Local Positioning. In: International Conference on RFID Technologies and Applications, 2013. S. 1-6.—ISBN 978-1-4799-2114-0.
Angerer, et al., "Direction of Arrival Estimation by Phased Array in RFID", European Association for Signal Processing, 2010.

* cited by examiner

POSITION SENSOR FOR THE SPATIALLY RESOLVED DETECTION OF OBJECTS IN A MONITORED ZONE

FIELD

The present invention relates to a position sensor for the spatially resolved detection of objects in a monitored zone, said position sensor comprising a measurement device for determining respective position signals for detected objects that are located in the monitored zone, and an RFID reading device that is configured to transmit RFID control commands into the monitored zone by generating modulated RFID transmission signals and to receive RFID response signals which are generated by an RFID transponder arranged at an object in response to received RFID control commands.

BACKGROUND

Vehicles controlled in an autonomous or semi-autonomous manner are increasingly being used in various technical areas, wherein they can be both land vehicles, and aircraft or watercraft. The operation can, for example, take place in the form of an open system, such as a public transport network of road traffic or air traffic. A further field of application is closed systems, such as logistics systems, for example warehouses or storage areas, where a large number of industrial trucks such as forklift trucks or transport vehicles are often used to convey, store and retrieve goods. Monitoring of the traffic areas is in particular necessary to control and avoid collisions. The monitoring often includes not only vehicles or other movable objects, but also people. Stationary objects such as stationary vehicles or loads must also be included in the monitoring.

For this purpose, it is necessary to determine the position of any objects present in the monitored zone. This can take place by means of suitable measurement devices that can determine the position of a detected object during the monitoring on the basis of different physical principles. In the context of this disclosure, the term "object" therefore refers to all conceivable objects, vehicles, persons, animals or the like whose positions can be detected by a measurement device.

For example, a radar device can be used as a measurement device to determine position signals of a detected object. Here, radio waves are transmitted into the monitored zone and waves reflected by any objects present there are detected. To enable a localization of a detected object, the determined position signal should comprise at least one distance coordinate (r or z) and preferably also at least one solid angle coordinate ($\varphi$ and/or $\theta$) or a Cartesian coordinate (x and/or y). With a primary radar, a localization of a detected object is indeed possible, but not an identification. To compensate for this disadvantage, so-called secondary radars are in particular used in air traffic. So-called cooperating targets are equipped with transponders that, after receiving a corresponding transmission signal from the secondary radar device, actively respond with a response signal that can, for example, comprise an identifier. However, such transponders that are suitable for secondary radar systems are very complex and are in particular dependent on their own power supply. A primary radar is additionally required for an additional localization of objects without transponders.

Another option for locating targets equipped with transponders is the so-called UWB localization. For this purpose, signals of very wide frequency ranges are used, wherein UWB stands for "ultra-wideband". However, a locating of targets without transponders is not possible with this technology either.

One option of identifying objects cost-effectively is provided by the use of RFID systems. An RFID system (radio frequency identification) refers to a transmitter-receiver system for the automatic and contactless identification and localization of objects using radio waves. An RFID system consists of an RFID transponder, which is located at or in the object to be identified and contains an identifying code, and an RFID reading device for reading out this identifier. The RFID reading device transmits modulated RFID transmission signals into the monitored zone. If an RFID transponder present in the monitored zone receives such an RFID transmission signal, it transmits an RFID response signal that can in turn be received by the RFID reading device. This RFID response signal comprises the identifier stored in the RFID transponder and possibly even further signals or information. The RFID transponder includes a microchip whose energy supply in the case of passive RFID transponders or RFID tags takes place via the high-frequency energy that is contained in the high-frequency alternating electromagnetic field generated by the RFID reading device and is picked up via an antenna of the RFID transponder. For active RFID transponders, a separate power supply is provided that is arranged in the RFID transponder or externally. The microchip activated in the RFID transponder decodes the RFID control commands transmitted by the RFID reading device and encodes and modulates the RFID response signals into the radiated electromagnetic field by field attenuation in the non-contact short circuit or by out-of-phase reflection of the field transmitted by the RFID reading device. Therefore, the RFID transponder usually does not generate a field itself, but influences the electromagnetic transmission field of the RFID reading device.

A method for improving a vehicle navigation system is known from WO 2020/053650 A1 in which one or more RFID transponders are arranged at a respective object to be detected, for example at a road user or a vehicle. In addition to its identifier or identification, the RFID transponder can transmit further information, for example about its position, its speed or its direction of movement. For the position determination, it is, however, necessary that a corresponding system, such as a GPS receiver, is arranged at the object in addition to the RFID transponder. However the complexity of the system and thus also the costs are hereby increased. Furthermore, an energy supply is necessary.

DE 10 2020 206 882 A1 discloses a combination of a radar or lidar system and an RFID system. A respective linking of position signals for objects that were determined by the measurement device, i.e. here a radar (radio detection and ranging) or lidar (light detection and ranging), with a specific RFID transponder is not possible. In one embodiment, the number of objects determined by means of radar and/or lidar is compared with the number of objects detected by means of RFID, with emergency braking or the like being performed if there is no match. It can therefore only be determined whether all objects marked with RFID transponders were also detected in the reading range of the RFID reading device by means of the environmental sensor. According to a further embodiment, the use of an RFID reading device is described that can additionally provide directional data.

SUMMARY

It is the object of the present invention to provide a position sensor that enables a position determination and identification of detected objects in a cost-effective manner.

The object is satisfied by a position sensor for the spatially resolved detection of objects in a monitored zone comprises a measurement device for determining respective position signals for detected objects that are located in the monitored zone, an RFID reading device that is arranged adjacent to the measurement device and that is configured to transmit RFID control commands into the monitored zone by generating modulated RFID transmission signals and to receive RFID response signals, which are generated by an RFID transponder arranged at an object in response to received RFID control commands, and to determine a phase shift between the RFID transmission signals and the RFID response signals, and an evaluation unit that is connected to the measurement device and the RFID reading device and that is configured to assign at least one respective, temporally corresponding RFID response signal to a respective position signal determined by the measurement device, considering the determined phase shift of this RFID response signal.

In this connection, assigning an RFID response signal to a position signal in particular also comprises determining that the position signal and an RFID response signal are to be assigned to the same object. The position signal determined by the measurement device comprises at least one distance coordinate and preferably also at least one solid angle coordinate or at least one further Cartesian coordinate.

The invention is based on the recognition of the inventors that, in an RFID system, a determined phase shift between the RFID transmission signals and the RFID response signals can be used to clearly assign temporally corresponding RFID response signals to the position signals, which are, for example, determined by means of radar, by considering this phase position, even if the solid angle position of the corresponding RFID transponder is not known. Said temporal correspondence between a position signal determined by the measurement device and an RFID response signal is to be understood such that the position signal and the RFID response signal are detected at the same point in time or at least within a defined short time period. It is thus ensured that both the position signal generated for a respective object and the RFID response signal originating from this object are generated approximately at the same position to ensure that a possibly occurring movement of the object in the time period between the generation of the two signals does not impair the detection result as far as possible. Accordingly, said short time period is preferably adapted to an expected maximum movement speed of the objects to be detected.

With the present invention, a disadvantage of conventional measurement devices such as radar devices can in particular also be compensated that consists in a limited resolution when determining the distance coordinate. It can thereby occur that, for example, two objects that partially obscure one another viewed in the viewing direction of the radar device and that only have a small radial distance from one another are possibly not separated from one another so that only a single object detection signal is generated for both objects. Since, with the position sensor according to the invention, respective RFID response signals are, however, additionally present for both objects, for which RFID response signals distance information is also known due to the determined phase position of these signals, the common position signal determined by the measurement device can be assigned to both the front and the rear object, wherein the initially inaccurately determined distance coordinate can be made more precise on the basis of the phase shifts for each object. The detection accuracy of the position sensor is hereby substantially improved.

According to a preferred embodiment, the measurement device comprises a radar device, a lidar device and/or a distance-measuring camera. In radar and lidar devices, the determination of the position of a detected object takes place in a known manner by emitting electromagnetic waves, i.e. radar waves or light waves, into the monitored zone, receiving waves that were passively remitted by the object, and determining a position of the object on the basis of the received waves. According to this definition, a 2D or 3D scanning device can also be synonymously subsumed under a lidar device. In a distance-measuring camera, the distance measurement takes place in a known manner by stereoscopy or by using a so-called TOF (Time Of Flight) image sensor in which the time of flight is determined for light signals that are emitted by an illumination unit into the monitored zone and re-emitted by the object to be detected in the direction of the TOF image sensor. The measurement device can generally also be formed as a combination of different distance-measuring measurement devices.

According to a further preferred embodiment, the evaluation unit is configured to generate an object detection signal for a respective object, with a position signal determined for this object and an identification code possibly encoded in the associated RFID response signal being contained in the object detection signal. The object signal can be transmitted to a higher-level control unit that, for example, transmits navigation signals to the detected objects or other devices of a higher-level system on the basis of the object detection signals. Thus, the position sensor is additionally configured to identify a detected object on the basis of an identification code possibly encoded in an RFID response signal.

According to a further preferred embodiment, the evaluation device is configured to determine the phase shift between the RFID transmission signals and the RFID response signals by a demodulation method, in particular an I&Q demodulation method. The term "I&Q demodulation method" is derived from the term "In-Phase and Quadrature". The reception signal is here split into two paths, wherein the one path of the demodulation is performed with the original phase ("in-phase") and produces the so-called I-data and the other path is performed with a 90° phase-shifted reference frequency of the RFID transmission signal and produces the Q-data. The size of the individual components I and Q can be calculated using an angle function, wherein the following applies:

$$I = A \cdot \cos\Phi$$

$$Q = A \cdot \sin\Phi$$

Based on this equation, a back calculation of the phase angle ¢ can be performed, wherein the following applies:

$$\Phi = \arctan\frac{Q}{I}.$$

A description of the carrier phase measurement in RFID systems and other wireless communication systems is disclosed in the publication R. Miesen, A. Parr, J. Schleu and M. Vossiek, "360° *carrier phase measurement for UHF RFID local positioning,"* 2013 *IEEE International Conference on RFID-Technologies and Applications* (*RFID-TA*), Johor Bahru, Malaysia, 2013, pp. 1-6, DOI: 10.1109/RFID-TA.2013.6694499.

According to a further preferred embodiment, the evaluation unit is configured to determine, by means of an optimization method, starting from a distance value that corresponds to a distance component of the position signal determined by the measurement device, considering the wavelength and the respective phase shift of one or more RFID response signals, an associated division remainder for respective divisions of the distance value by different integer multiples of the wavelength λ and to assign a respective RFID response signal to this position signal if the difference amount between the phase shift of this RFID response signal and the division remainder of this division is minimal for one of the respective divisions.

As part of this optimization method, the distance value that was, for example, determined using radar, is divided by λ, 2λ, 3λ, etc., for example, and the difference amount between the previously determined phase shift of the RFID response signal to be considered and the respective division remainder is determined for each of these divisions. If the "Difference amount minimal" criterion is met for one of these divisions, the corresponding RFID response signal is assigned to the position signal whose distance value was examined. Said criterion according to which the difference amount should be minimal is to be understood as the reference amount having to be equal to zero or less than a predefined threshold value to fulfill the mentioned criterion. For each position signal, a plurality of RFID response signals can generally also be checked for a match of their respective phase position with the distance value. In this way—as already mentioned above as an example—two or more RFID response signals may possibly be assigned to a position signal determined by radar, for example. By means of the RFID phase position, those objects can thereby be separated from one another whose distance is smaller than the resolution power of the measurement device.

In this connection, it has proven to be advantageous if the determination of position signals, the determination of phase shifts of RFID response signals and the determination of the division test take place cyclically, wherein the evaluation unit is configured to assign the correspondingly varying RFID response signal to a position signal that does not vary during a predefined number of cycles, or only varies within a predefined position range, only if the respective difference amount during the predefined number of cycles is minimal. In other words, a moving or stationary object is observed over several cycles, wherein the assignment only takes place if the assignment criterion is fulfilled in each or at least in a majority of these cycles.

According to a further preferred embodiment, the RFID reading device has a transmission circuit for generating and transmitting the RFID transmission signals and a reception circuit for receiving the RFID response signals, wherein the transmission circuit and the reception circuit are designed such that, in addition to the received RFID response signals, at least some of the RFID transmission signals are received directly by the reception circuit as RFID leakage signals, and wherein the evaluation unit is configured to evaluate the phase shift between the RFID leakage signals received by the reception circuit and the RFID response signals. The direct receiving of the leakage signals from the reception circuit means that this takes place by crosstalk and in particular without being influenced by the RFID transponder. The transmission circuit and the reception circuit have at least one respective antenna, wherein the RFID leakage signals irradiated by the transmission antenna are detected directly by the reception antenna. If a plurality of transmission antennas or reception antennas are provided, distance information for the RFID reception signals can also be determined in addition to the phase position. This additional distance information can likewise be considered when assigning RFID response signals to the position signals.

BRIEF DESCRIPTION OF THE DRAWINGS

Further advantages of the position sensor according to the invention and advantageous embodiments result from the following description of the drawings. Embodiment examples of the invention are shown in the drawings. The drawings, the description and the claims include numerous features in combination. The skilled person will also expediently consider these features individually and combine them into further sensible combinations.

There are Shown.

DETAILED DESCRIPTION

Figure 1:
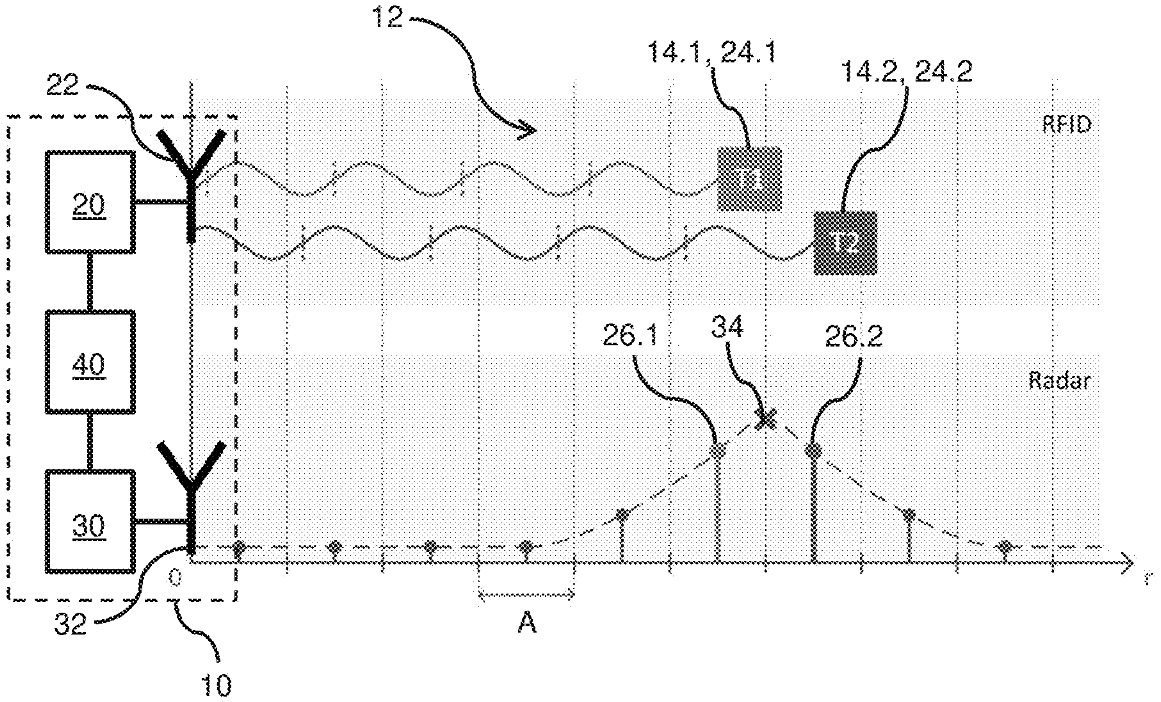
FIG. 1 a schematic representation of a position sensor according to an embodiment example.

FIG. 1 shows a position sensor 10 according to an embodiment example that is configured for the spatially resolved detection of objects in a monitored zone 12. Two objects 14.1, 14.2 at different distances from the position sensor 10 are shown by way of example in FIG. 1. The position sensor 10 comprises a measurement device 30 for determining respective position signals for detected objects 14.1, 14.2 that are located in the monitored zone 12. In the embodiment example, the measurement device is configured as a radar device 30 and can comprise a pivotable transmission and reception antenna for scanning the monitored zone 12 or, in addition to a transmission antenna, an array of reception antennas for the spatially resolved reception of the transmission signals reflected at an object 14.1, 14.2. In FIG. 1, the transmission and reception antennas are symbolized by a single antenna 32.

According to modifications, the measurement device can also be configured as a lidar device or as a distance-measuring camera in which the distance measurement takes place by means of stereoscopy or by using a time-of-flight-measuring TOF sensor.

The position sensor 10 furthermore comprises an RFID reading device 20 that is arranged adjacent to the radar device 30 and that is configured to transmit RFID control commands into the monitored zone by generating modulated RFID transmission signals and to receive RFID response signals. The RFID reading device 20 is advantageously arranged at only a small lateral distance from the radar device 30 to minimize any parallax errors.

Respective RFID transponders 24.1, 24.2 are arranged at or are integrated into the objects 14.1, 14.2. The RFID transponders 24.1, 24.2 can be configured as active or passive RFID transponders. An RFID transponder 24.1, 24.2 responds to a received RFID control command with the transmission of an RFID response signal that may contain even further information in addition to an identifier or an identification code that enables a unique identification of the respective RFID transponder 24.1, 24.2. The transmission of the RFID response signals takes place in a known manner by modulating the irradiated electromagnetic transmission field of the RFID reading device 20, wherein both a field attenuation and an out-of-phase reflection of the field transmitted by the RFID reading device 20 can take place. The RFID reading device 20 is connected to respective antennas and/or antenna arrays, which are symbolically represented by the antenna 22 in FIG. 1, to generate the modulated RFID transmission signals and to receive the RFID response signals.

There is a fixed phase relationship between the RFID transmission signals and the RFID response signals that depends on a distance r of the respective object 14.1, 14.2 or of the RFID transponder 24.1, 24.2 arranged at this object 14.1, 14.2 from the position sensor 10 or the RFID reading device 20.

A phase shift φ between the RFID transmission signals and the RFID response signals can, for example, be determined by a demodulation method, in particular an I&Q demodulation method.

In the lower part of FIG. 1, various signals are drawn symbolically as dots, wherein their position on the r axis depends on the object distance. The radar device 30 has a limited distance resolution A that is symbolized by a corresponding double arrow in FIG. 1. Objects disposed close to one another or behind one another, such as the objects 14.1, 14.2 in FIG. 1, can no longer be resolved by the radar device 30. No separate position signals are thereby generated for the objects 14.1, 14.2, but rather a common position signal 34.

With the position transmitter 10 according to the invention, it is possible, on the basis of the RFID response signals transmitted by the RFID transponders 24.1, 24.2, to detect and identify the two objects 14.1, 14.2 separately from one another, which would not be possible with the radar device 30 alone.

This can take place by means of an evaluation unit 40 of the position sensor 10 that is connected to the RFID reading device 20 and the radar device 30. The RFID reading device 20, the radar device 30 and the evaluation unit 40, including the antennas 22, 32, can be integrated in a common housing, which is symbolized by the dashed box in FIG. 1. The evaluation unit 40 is configured, considering the position signal 34 determined by the radar device 30 and the determined phase shifts of the RFID response signals generated by the RFID transponders 24.1, 24.2, to determine corresponding position signals 26.1, 26.2 that are specified or corrected with respect to the distance (shown in the lower part of FIG. 1).

Depending on the selected wavelength of the RFID transmission signals, it is only possible to a limited extent to determine the distance of an object 14.1, 14.2 from the position sensor 10 (or its RFID reading device 20) solely based on the phase shift since the unambiguity range is limited to a maximum of one wavelength. However, by considering the position signal 34 determined by means of the radar device 30, it is possible to estimate the associated distance of an RFID response signal and to assign said distance to a specific object 14.1, 14.2 in the form of a corrected position signal 26.1, 26.2.

Figure 2:
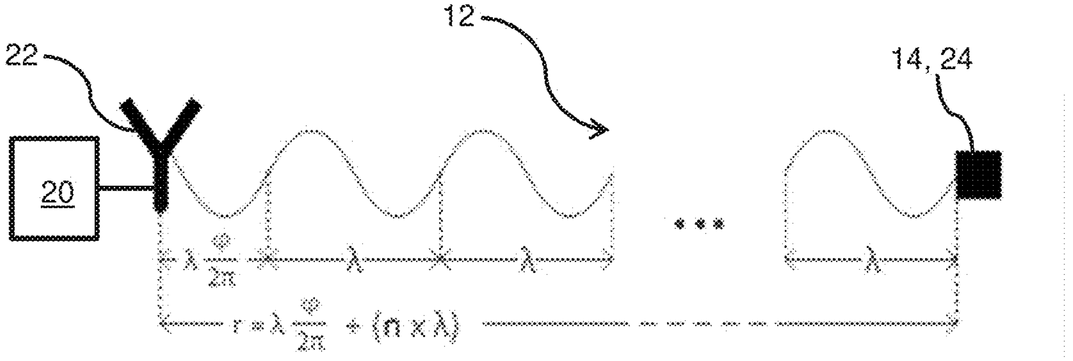
FIG. 2 a diagram that illustrates a determined phase shift between RFID transmission signals and RFID response signals.

This relationship will be explained in detail below with reference to FIG. 2. In FIG. 2, different wave trains are shown symbolically for an RFID reading device 20 and a single object 14 with an RFID transponder 24 arranged at it or integrated in it. Depending on the distance r of the object 14 from the RFID reading device 20, an RFID response signal has a certain time-of-flight delay compared to the temporally corresponding RFID transmission signal, wherein a certain number n of complete periods and a fraction of a period can be assigned to this time-of-flight delay in accordance with the distance r, considering the propagation speed of the radar waves. The fraction of a period results from the determined phase shift φ in accordance with $$\lambda \cdot \frac{\varphi}{2\pi}.$$

The following relationship thus applies to the distance r:

$$r = \lambda \cdot \frac{\varphi}{2\pi} + (n \cdot \lambda).$$

By means of an optimization method, for the distance value r, which corresponds to the distance component of the position signal 34 determined by the radar device 30, associated division remainders can be determined for respective divisions of the distance value r by different integer multiples of the wavelength λ, considering the wavelength λ and the determined phase shift φ of the RFID response signals on which the corrected position signals 26.1, 26.2 are based. A respective RFID response signal can be assigned to the position signal 34 determined by the radar device 30 if the difference amount between the phase shift of this RFID response signal and the division remainder of this division is minimal for a respective division.

In other words, the distance value r can, for example, be divided by λ, 2λ, 3λ . . . as part of the optimization method and the difference amount between the phase shift q of the RFID response signal to be considered and the respective division remainder can be determined for each of these divisions. If the difference amount for one of these divisions becomes minimal, the respective RFID response signal is assigned to the position signal 34 whose distance value r was examined. This optimization method can be mathematically expressed by the function, $$\min\left(\lambda \frac{\varphi}{2\pi} - \text{modulo}(r, n_i \cdot \lambda)\right),$$

where the operator $n_i$ represents the variation over the integer multiples of λ.

With reference to the schematic embodiment example of FIG. 1, this means that, for both objects 14.1, 14.2, said division remainder for the number of periods n=4 shown there becomes minimal.

It is understood that the position signals and RFID response signals under consideration must correspond in time, i.e. they should preferably be generated or detected at the same point in time or with a very small time difference so that intermediate movements of an object do not falsify the assignment result.

Advantageously, both the position signals and the RFID response signals are therefore determined over a plurality of measurement cycles and a corresponding assignment is only made if no or only a slight deviation in the determined distance values was determined over the plurality of measurement cycles.

One advantage of the position sensor 10 according to the invention is that, compared to a position recognition system based exclusively on RFID technology, overreaches due to radio technology that often occur there can be easily and robustly detected and suppressed by means of the position determination performed by the measurement device 30, in particular by means of radar measurement.

A preferred field of application for the position sensor 10 according to the invention is, for example, in closed areas in which at least some of the potentially dangerous objects present there are equipped with RFID transponders and an identification and tracking are thus possible. By combining a distance measurement by means of radar, lidar or camera with the determination of the phase shift of RFID response signals, resolution problems in complex scenarios can be resolved. As a further advantage over exclusively RFID-based systems, the configuration of a monitoring system can be simplified due to the suppression of overreaches.

REFERENCE NUMERAL LIST

10 position sensor
12 monitored zone
14, 14.1, 14.2 object
20 RFID reading device
22 antenna of the RFID reading device
24, 24.1, 24.2 RFID transponder
26.1, 26.2 corrected position signal
30 measurement device, radar device
32 antenna of the radar device
34 position signal
40 evaluation unit
A resolution of the radar device
r distance

The invention claimed is:

1. A position sensor for the spatially resolved detection of objects in a monitored zone, said position sensor comprising a measurement device for determining respective position signals for detected objects that are located in the monitored zone, an RFID reading device that is arranged adjacent to the measurement device and that is configured to transmit RFID control commands into the monitored zone by generating modulated RFID transmission signals and to receive RFID response signals, which are generated by an RFID transponder arranged at an object in response to received RFID control commands, and to determine a phase shift between the RFID transmission signals and the RFID response signals, and an evaluation unit that is connected to the measurement device and the RFID reading device and that is configured to assign at least one respective, temporally corresponding RFID response signal to a respective position signal determined by the measurement device, considering the determined phase shift of this RFID response signal, wherein the evaluation unit is configured to determine, by means of an optimization method, starting from a distance value that corresponds to a distance component of the position signal determined by the measurement device, considering the wavelength and the respective phase shift of one or more RFID response signals, an associated division remainder for respective divisions of the distance values by different integer multiples of the wavelength and to assign a respective RFID response signal to this position signal if the difference amount between the phase shift of this RFID response signal and the division remainder of this division is minimal for one of the respective divisions.

2. The position sensor according to claim 1, wherein the measurement device comprises a radar device, a lidar device and/or a distance-measuring camera.

3. The position sensor according to claim 1, wherein the evaluation unit is configured to generate an object detection signal for a respective object, with a position signal determined for this object and an identification code encoded in the associated RFID response signal being contained in the object detection signal.

4. The position sensor according to claim 1, wherein the evaluation unit is configured to determine the phase shift between the RFID transmission signals and the RFID response signals by a demodulation method.

5. The position sensor according to claim 1, wherein the demodulation method is an I&Q demodulation method.

6. The position sensor according to claim 1, wherein the determination of position signals, the determination of phase shifts of RFID response signals and the determination of the division test take place cyclically, with the evaluation unit being configured to assign the correspondingly varying RFID response signal to a position signal that does not vary during a predefined number of cycles, or only varies within a predefined position range, only if the respective difference amount during the predefined number of cycles is minimal.

* * * * *